US011296953B1

(12) United States Patent
Ponnuswamy

(10) Patent No.: US 11,296,953 B1
(45) Date of Patent: Apr. 5, 2022

(54) MODIFYING DATA PACKET TRANSMISSION CHARACTERISTICS BY AN INTERMEDIATE NODE ON A COMMUNICATION PATH

(71) Applicant: CLOUDBRINK INC., Sunnyvale, CA (US)

(72) Inventor: Subbu Ponnuswamy, Saratoga, CA (US)

(73) Assignee: CLOUDBRINK INC., Sunnyvale, CA (US)

( * ) Notice: Subject to any disclaimer, the term of this patent is extended or adjusted under 35 U.S.C. 154(b) by 0 days.

(21) Appl. No.: 17/126,543

(22) Filed: Dec. 18, 2020

(51) Int. Cl.
*H04L 12/24* (2006.01)
*H04L 41/5009* (2022.01)
*H04L 41/5022* (2022.01)
*G06K 9/62* (2022.01)
*H04L 43/16* (2022.01)
*H04L 41/16* (2022.01)
*H04L 43/0864* (2022.01)

(52) U.S. Cl.
CPC ........ *H04L 41/5009* (2013.01); *G06K 9/6256* (2013.01); *H04L 41/16* (2013.01); *H04L 41/5022* (2013.01); *H04L 43/0864* (2013.01); *H04L 43/16* (2013.01)

(58) Field of Classification Search
None
See application file for complete search history.

(56) References Cited

U.S. PATENT DOCUMENTS

| 2004/0114576 A1* | 6/2004 | Itoh | H04L 65/604 370/352 |
| 2011/0019552 A1* | 1/2011 | Karaoguz | H04L 45/124 370/236 |
| 2011/0058554 A1* | 3/2011 | Jain | H04L 45/123 370/392 |
| 2012/0134668 A1* | 5/2012 | Freiberger | H04L 45/00 398/25 |
| 2012/0236713 A1* | 9/2012 | Kakadia | H04L 47/2458 370/230 |
| 2017/0063705 A1* | 3/2017 | Gilson | H04L 47/283 |
| 2017/0118737 A1* | 4/2017 | Batchu | H04W 76/10 |
| 2018/0302832 A1* | 10/2018 | Huang | H04L 45/302 |
| 2018/0317108 A1* | 11/2018 | Schmidt | H04W 24/10 |
| 2019/0020563 A1* | 1/2019 | Meilik | H04L 43/16 |
| 2019/0363976 A1* | 11/2019 | Thubert | H04L 45/02 |
| 2020/0382580 A1* | 12/2020 | Devanneaux | H04L 67/28 |

* cited by examiner

Primary Examiner — Joshua Joo
(74) Attorney, Agent, or Firm — Invoke

(57) ABSTRACT

Techniques for modifying data packet transmission characteristics by an intermediate node in a network are disclosed. An intermediate node in a data transmission network determines a current estimated transmission time for packets being transmitted from the source node to the intermediate node. The node analyzes a data packet to determine a Quality of Service (QoS) requirement for transmission of the first data packet. Based on the current estimated transmission time for packets being transmitted from the source node to the intermediate node and the QoS requirement for transmission of the first data packet, the intermediate node selects one or more transmission characteristics for forwarding the first data packet toward the destination node. The intermediate node transmits the packet toward the destination node in accordance with the one or more transmission characteristics.

22 Claims, 7 Drawing Sheets

MODIFYING DATA PACKET TRANSMISSION CHARACTERISTICS BY AN INTERMEDIATE NODE ON A COMMUNICATION PATH

TECHNICAL FIELD

The present disclosure relates to modifying transmission characteristics of data packets by an intermediate node along a communication path between a source node and a destination node. Specifically, the intermediate node modifies transmission characteristics of a data packet to ensure that end-to-end QoS requirements for the data packet are met by the transmission from the source node to the destination node.

BACKGROUND

Data transmission networks span the globe to connect users to remote servers running applications accessible to the users. A network may include one or more intermediate nodes between the user at one end of the network and an end server at another end of the network. The end server may store or execute the application being run by the user. Data transmitted through the network may be assigned a priority based on the type of data, such as voice or video data based on a desired quality of service.

IP networks support Differentiated Services Code Points (DSCP), that may be used to assign priorities to certain classes of traffic. For example, voice traffic may be marked as "Expedited Forwarding" (EF) and Video traffic may be marked as "Assured Forwarding" (AF). Intermediate routers may or may not honor these classes or priorities. On the Internet, routers from one service provider often do not honor the DSCP markings from another provider. In addition, intermediate routers rewrite DSCP values in the IP header.

DSCP only defines "classes" of traffic. As an example, if there are 10,000 voice calls going through the same router per-minute, all voice traffic may be marked as AF. The router may choose to provide some "aggregate" treatment to these voice calls. However, there is no per-flow treatment possible with DSCP, and only per-class treatment is possible. One example of how a router may treat per-class traffic includes queueing the AF/EF packets into a priority queue (so they can be transmitted prior to other packets). Another example includes dropping from the head of the queue instead of the tail of the queue (since most multimedia packets are useless after a certain amount of delay). In other words, DSCP may be used to determine how a packet should be treated prior to forwarding to the next hop.

The most common use of DSCP is when the QoS parameters are passed between different network layers on the same machine. For example, IEEE 802.11 implements a similar scheme at layer 2 called Access Categories (AC), where audio, video, best effort, and background traffic can be assigned different priorities in accessing a wireless medium. Applications such as Skype or Zoom may mark IP packets with different DSCP for audio and video. The 802.11 layer may look at the DSCP values and then map those streams to a specific AC.

Another example of a QoS protocol is the resource reservation protocol (RSVP). RSVP is a reservation protocol, where the source transmits a reservation message containing the description of the flow (Source/Destination IP address, Source/Destination Port, Protocol Type). The intermediate nodes are expected to "reserve" resources for this flow. The sender transmits what is called a FLOWSPEC which defines how the flow should be treated (bandwidth/drop policy, scheduling parameters, maximum packet size, etc.). However, RSVP includes the following drawbacks: 1) Reserving bandwidth is not scalable 2) Routers are not required to honor the RSVP requests unless they belong to the same provider or have an agreement with the same provider 3) Similar to DSCP, RSVP does not address the end-to-end QoS, since the actions taken at one hop are independent of the actions taken at another hop.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
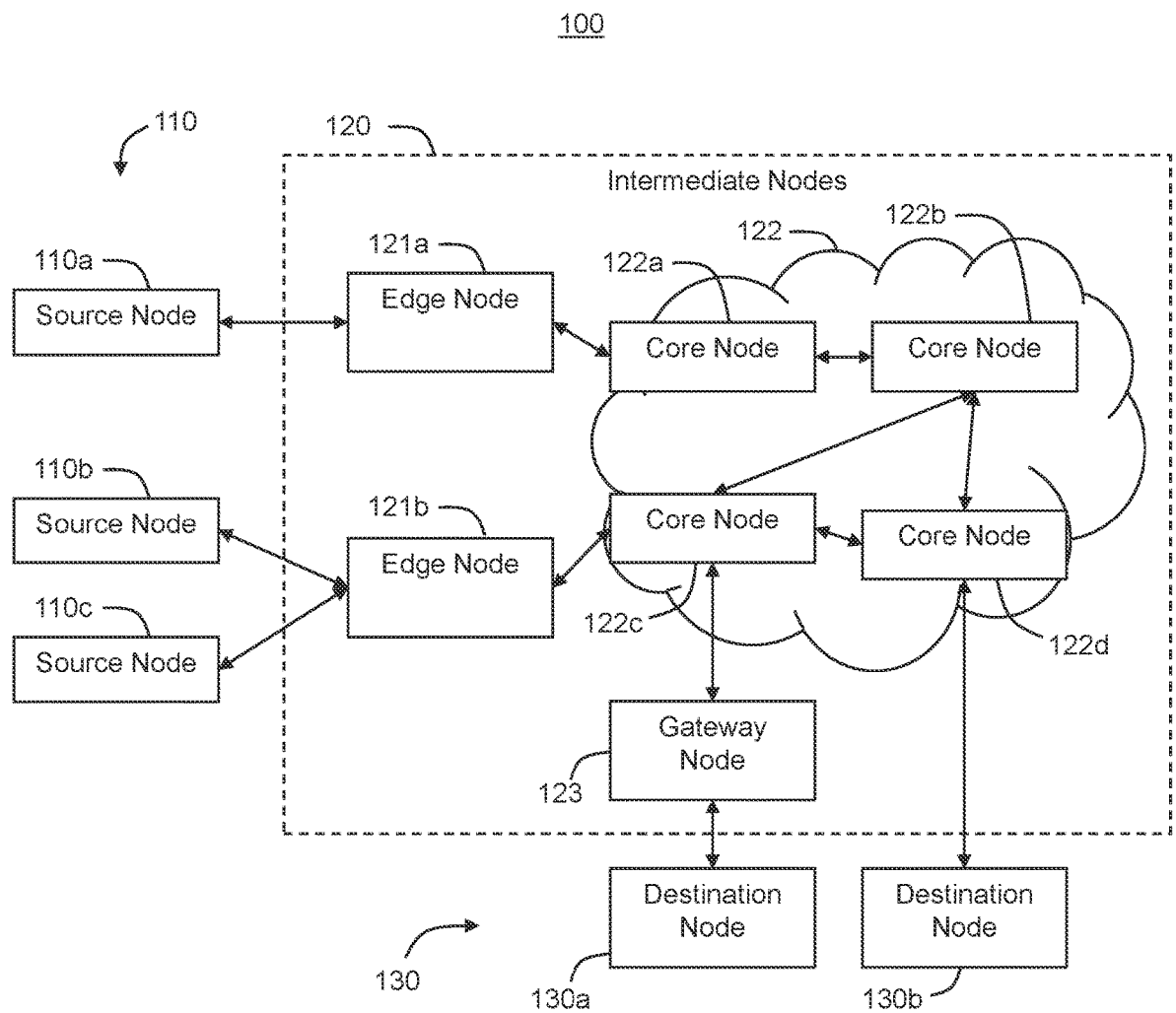
FIGS. 1A and 1B illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MODIFICATION OF PACKET TRANSMISSION CHARACTERISTICS BY AN INTERMEDIATE NODE
4. EXAMPLE EMBODIMENT OF DATA PACKET
5. EXAMPLE EMBODIMENT OF MODIFICATION OF PACKET TRANSMISSION CHARACTERISTICS
6. COMPUTER NETWORKS AND CLOUD NETWORKS
7. MISCELLANEOUS; EXTENSIONS
8. HARDWARE OVERVIEW

1. General Overview

One or more embodiments modify the transmission attributes of a data packet at an intermediate node along a communication path between a source node and a destination node. The intermediate node may modify the transmission attributes of a data packet, for example, in an effort to meet an end-to-end quality-of-service (QoS) requirement for the data packet. The QoS requirement includes, but is not limited to, defined levels of end-to-end latency, jitter, and loss rate.

Modifying transmission characteristics may include, for example, changing a priority level or altering a transmission path. Modifying transmission characteristics may include modifying packet redundancy by duplicating the packet to generate additional copies of the packet for transmission to the destination node. Modifying transmission characteristics may also include applying a particular packet acceleration technique, such as forward error correction (FEC), duplication, multipath transmission, interleaving, piggybacking, or per-hop retransmission.

The intermediate node may determine whether a modification of transmission attributes of a packet is needed based on the network characteristics of (a) the portion of the communication path from the source node to the intermediate node and/or (b) the portion of the communication path from the intermediate node to the destination node.

In an example, the transmission of a packet from the source node to the intermediate node may be delayed due to network congestion on the portion of the communication path from the source node to the intermediate node. The intermediate node determines, due to the already-occurred delay, that the transmission of the packet based on the packet's current transmission attributes would not result in meeting end-to-end QoS requirements for transmission of the packet from the source node to the destination node. The intermediate node may modify the transmission attributes corresponding to the packet to assign a "high-priority" designation to the packet. As a result, the packet is transmitted from the intermediate node to the destination node at a faster speed than would be expected for a packet with a "low-priority" designation. The high priority designation for achieving faster speed for completing the transmission may be implemented via additional duplication, multipath transmissions, aggressive FEC parameters, or other performance enhancing techniques. The faster speed from the intermediate node to the destination node offsets the delay caused by the delayed transmission from the source node to the intermediate node. The total time for transmitting the packet from the source node to the destination node meets the end-to-end QoS requirements for the packet.

The intermediate node may also, alternatively or additionally, modify transmission attributes based on detected delay of packets transmitted from the intermediate node to the destination node. Based on the detected delay conditions, the intermediate node may increase packet priority for reducing the latency to offset the expected delay from the intermediate node to the destination node.

In another example, the system determines that there is a high rate of failure corresponding to packet transmissions from the intermediate node to the destination node, i.e., at least one of the network hops from the intermediate node to the destination node is experiencing a high packet drop rate. Based on this high rate of failure, the intermediate node duplicates a packet received from the source node to generate a new copy of the packet. The intermediate node then transmits both the original packet and the copy toward the destination node, thereby increasing packet redundancy. In addition, or in the alternative, the system may predict or estimate that there will be a high rate of failure corresponding to packet transmissions from the intermediate node to the destination node. Based on the expected high rate of failure, the intermediate node may perform packet duplication. An intermediate node implementing checks for packet failure rates and increasing packet redundancy improves performance over systems in which only the source node determines packet redundancy. Implementing packet redundancy at intermediate nodes allows for a single copy (or lower number of copies) of the packet to be transmitted from the source node to the intermediate node.

In one or more embodiments, the system achieves end-to-end QoS by creating an overlay network that operates on top of an IP network. The overlay network routes traffic through predetermined routers capable of analyzing data packets to calculate an estimated transmission time for the packets and modifying data packet headers to achieve end-to-end QoS.

In one or more embodiments, "history" information is carried by each packet header. The history information identifies the experience of the packet thus far (such as delay, jitter, or retransmission). Each intermediate node along a transmission path may update the history information. Accordingly, each intermediate node along the transmission path may treat the packet differently based on what the packet has encountered so far during transmission.

For example, the "latency" portion of the "history" field may have 8, 5 and 53, where 8 indicates that the end-to-end expected latency is 80 ms, 5 indicates the packet has already spent 50% of the latency credit (i.e., it has already been subjected to 40 ms of latency), and 53 indicates the packet corresponds to a video chat call, audio stream, with a specific CODEC, and therefore should be subjected to only a certain level of jitter, delay, etc.

In one or more embodiments, each intermediate node along a transmission path may implement any one or more acceleration techniques to a packet based on the packet "history." Different intermediate nodes may apply different acceleration techniques to the same packet based on changes in the packet "history" between the respective intermediate nodes.

In one or more embodiments, end-to-end packet lifecycle information is generated as and updated as the packets traverse intermediate nodes. One or more embodiments described in this Specification and/or recited in the claims may not be included in this General Overview section.

2. System Architecture

A data transmission system analyzes network characteristics and packet attributes of packets traveling through the network. The system modifies packet transmission characteristics by an intermediate node in the network to achieve a desired quality-of-service (QoS).

Figure 1B:
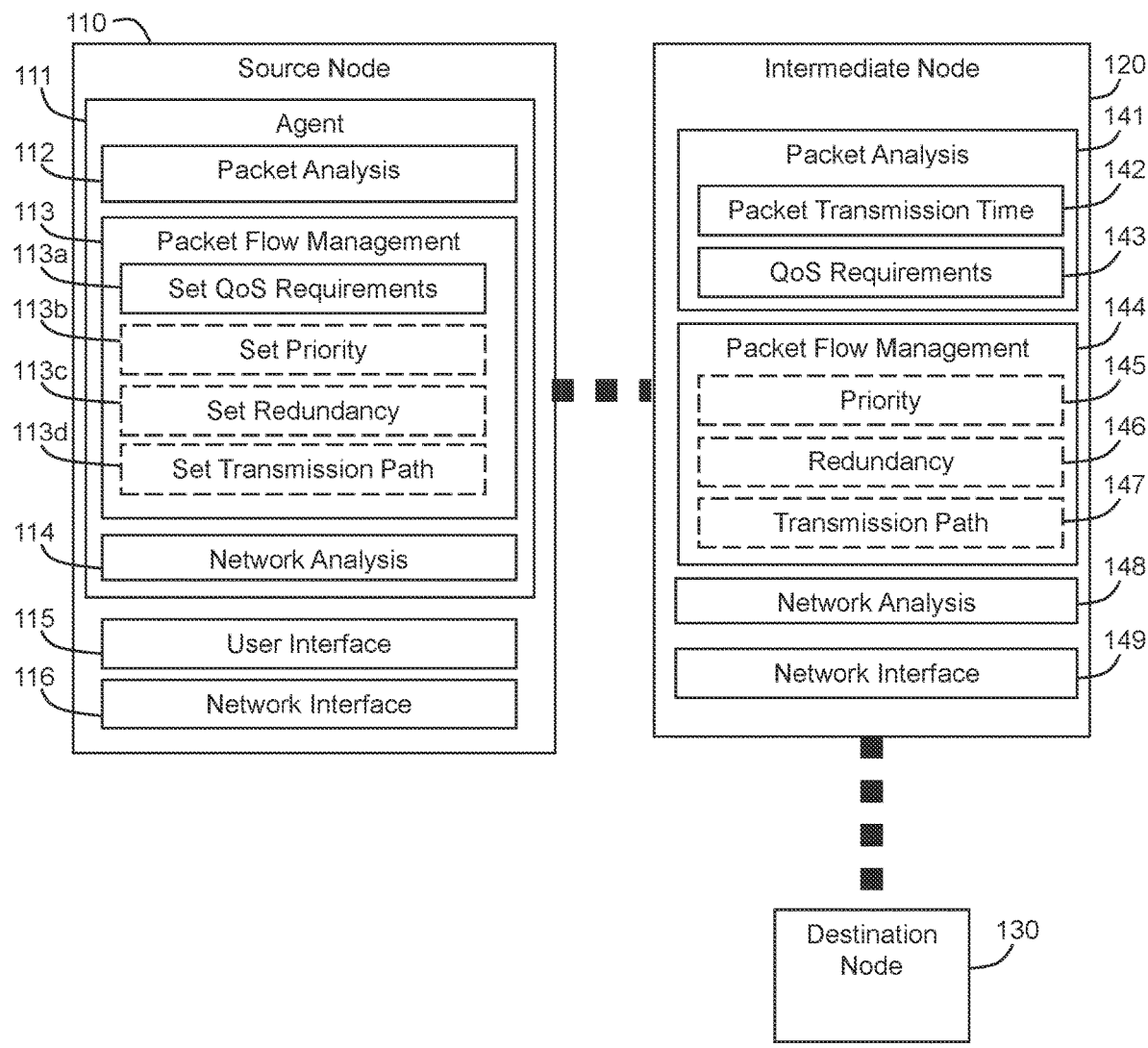

FIGS. 1A and 1B illustrate a system 100 in accordance with one or more embodiments. As illustrated in FIG. 1A, system 100 includes one or more source nodes 110, one or more intermediate nodes 120, and one or more destination nodes 130.

FIG. 1A illustrates three source nodes 110a, 110b, and 110c. A source node 110 is a device, or a client running on a device, that generates a data packet to be transmitted to a destination node 130. FIG. 1A illustrates two destination nodes 130a and 130b. A destination node 130 is a device, or a program running on a device, that receives the data packet from the source node 110. In one or more embodiments, the destination nodes 130 are servers that run applications accessible by users at the source nodes 110. For example, a user device may run a client configured to run one or more applications stored on the destination node 130a or 130b. The source node 110 generates a flow of data including data packets when communicating with the destination nodes 130.

The source nodes 110 communicate with the destination nodes 130 via the intermediate nodes 120. The intermediate nodes 120 include any intervening nodes between the source nodes 110 and the destination nodes. In the example illustrate in FIG. 1A, the intermediate nodes 120 include edge nodes 121a and 121b, core nodes 122a-122d, and a gateway node 123. The edge nodes 121a and 121b, core nodes 122a-122d, and gateway node 123 may be servers in a data network 122, for example. In one embodiment, the edge nodes 121a and 121b include servers, or software running on servers, that provide an interface between a local network and a core network. Similarly, in one embodiment, the gateway node 123 is a server, or software running on a server, that routes traffic from a core network to one or more destination devices.

In one or more embodiments, the data communication paths between the source nodes 110 and the destination nodes 130 may include direct connections, the Internet, or private or commercial communication protocols.

Any intermediate node 120 between any two other nodes may be configured to analyze data packets and to modify transmission characteristics of the data packets to enable end-to-end acceleration of the data packets through the network. Modifying transmission characteristics may include, for example, changing a priority level or altering a transmission path. Modifying transmission characteristics may include modifying packet redundancy by duplicating the packet to generate additional copies of the packet for transmission to the destination node. Modifying transmission characteristics may also include applying a particular packet acceleration technique, such as forward error correction (FEC), duplication, multipath transmission, interleaving, piggybacking, or per-hop retransmission.

In one or more embodiments, the system 100 achieves end-to-end QoS by creating an overlay network, including the intermediate nodes 120, that operates on top of an IP network. The overlay network routes traffic through predetermined routers (e.g. nodes 121a, 121b, 122a-122d, 123) capable of analyzing data packets to calculate an estimated transmission time for the packets and modifying data packet headers to achieve end-to-end QoS.

FIG. 1B illustrates a source node 110 and intermediate node 120 in further detail. The source node 110 includes an agent 111. The agent 111 may include a program or application loaded onto a device to allow the device access to a particular communication protocol.

The agent 111 includes a packet analysis module 112, a packet flow management module 113, and a network analysis module 114. The packet analysis module 112 includes logic to analyze packets to identify packet attributes. The packet flow management module 113 includes logic to set quality-of-service (QoS) requirements 113a based on the identified packet attributes. The packet flow management module 113 may also include logic to set transmission characteristics, such as one or more of packet priority 113b, redundancy 113c, and a transmission path 113d, based on the QoS requirements and the network analysis. The packet flow management module 113 may store the QoS requirements in the data packet by creating a header and attaching the header to the data being transmitted to a destination node 130. In one or more embodiments, the header is a variable size header including protocol information for a particular data transmission protocol, the QoS requirements for the packet, and historical information identifying the packet's experience in the data transmission network.

The source node 110 includes a user interface 115 and a network interface 116. The user interface 115 allows a user to interact with the agent 111. The network interface 116 allows the source node 110 to interact with other devices on the network.

The intermediate node 120 includes a packet analysis module 141, a packet flow management module 144, a network analysis module 148, and a network interface 149. The packet flow analysis module 141 includes logic to analyze a packet transmission time 142 and QoS requirements of the packet 143. The packet transmission time 142 may include historical information regarding the experience the packet has had so far along the data transmission network. For example, when the intermediate node 120 analyzes the estimated packet transmission time between the source node 110 and the intermediate node 120, the intermediate node 120 may update a value in a "history" field of a header of the data packet to identify a level of delay experience so far by the data packet. The packet flow management module 144 includes logic to set one or more of packet priority 145, redundancy 146, and a transmission path 147 based on the QoS requirements and the network analysis.

Additional embodiments and/or examples relating to computer networks are described below in Section 6, titled "Computer Networks and Cloud Networks."

In one or more embodiments, the data transmission system 100 refers to hardware and/or software configured to perform operations described herein for analyzing and transmitting data through a data network. Examples of operations for analyzing data, modifying transmission characteristics of data packets, and transmitting the data in a network are described below with reference to FIG. 2.

In an embodiment, the data transmission system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, user interface 115 refers to hardware and/or software configured to facilitate communications between a user and the data transmission system 100. The user interface 1116 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of user interface 115 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 115 is specified in one or more other languages, such as Java, C, or C++.

Figure 2:
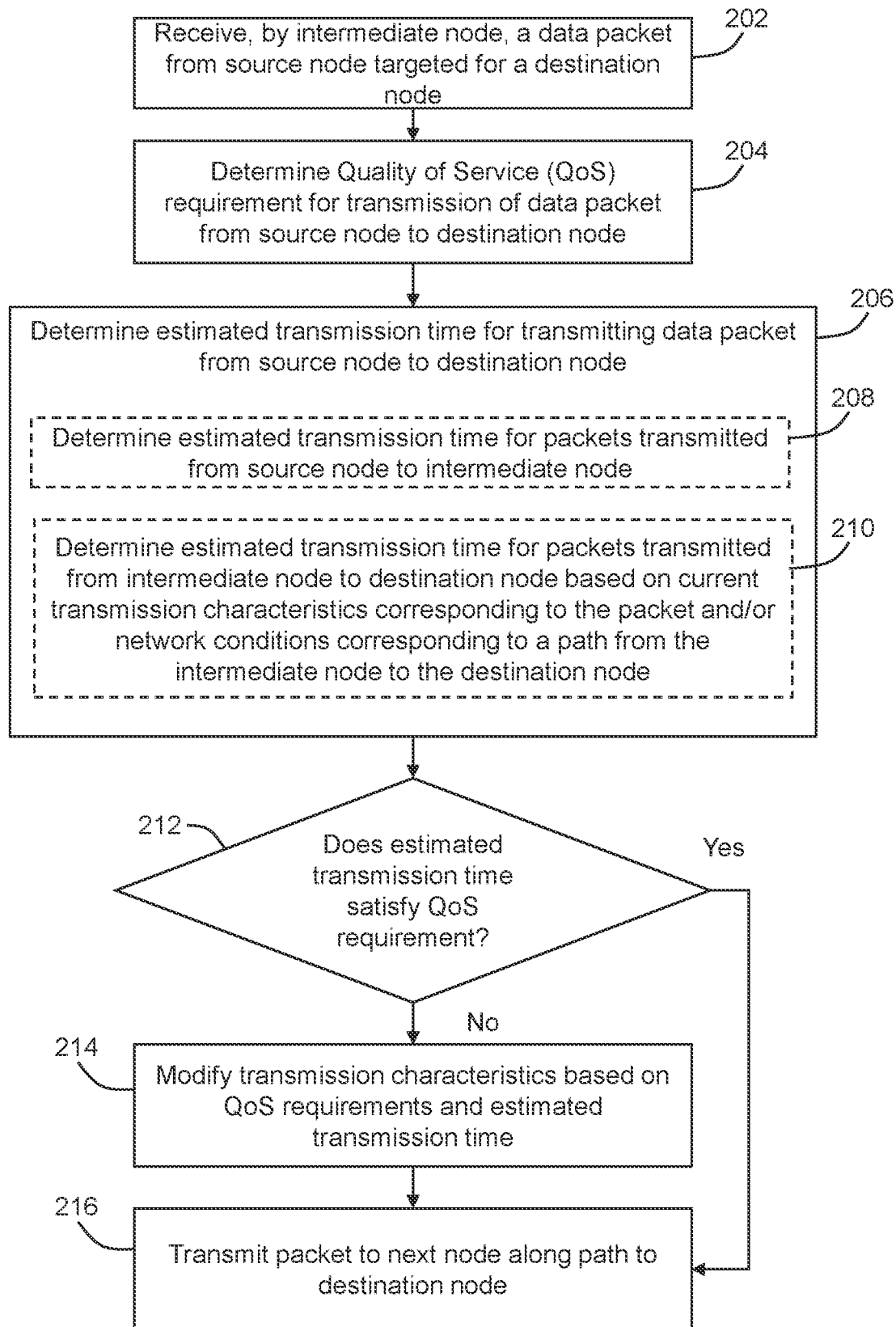
FIG. 2 illustrates an example set of operations for changing transmission characteristics of data packets by an intermediate node in accordance with one or more embodiments.

3. Modification of Packet Transmission Characteristics by an Intermediate Node FIG. 2 illustrates an example set of operations for analyzing a network and modifying packet transmission characteristics in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

An intermediate node in a data transmission system receives a data packet from a source node (Operation 202). The data packet is typically part of a flow of data packets transmitting data between nodes in the network. The data packets include one or more headers for managing and directing the flow of data in the network. The headers may correspond to different data transmission protocols or different networks through which the data is to be transmitted. The data packets also include a body including the data being transmitted to a destination for use by processes or applications running at the destination. The intermediate node may receive the data packet directly from the source node or from another intervening intermediate node The data packet includes a field identifying a quality of service (QoS) requirement for the data packet (Operation 204). In one embodiment, the QoS requirement is represented by a value selected from among two or more values that each correspond to a different treatment of the data packet as the data packet is transmitted through the data network from a source node to a destination node. In one embodiment, the QoS requirement is represented as a priority index value having a predetermined range. A value at one end of the range corresponds to a first set of transmission characteristics and a value at an opposite end of the range corresponds to another set of transmission characteristics. The values between the ends of the range correspond to varying transmission characteristics between the first set and the second set.

For example, the QoS requirement may correspond to a Wi-Fi Multimedia (WMM) protocol having as different QoS levels: background, best effort, video, and voice. In this example, a data packet having a QoS of "background" is transmitted at a lower priority than a data packet having a QoS of "best effort."

In another example, the QoS requirement may correspond to a differentiated services (DiffServ) protocol. In a DiffServ protocol, packets entering the network are classified according to the type of data being transmitted. Each node, or hop, in the network handles the packet according to the classification. The classification is stored in a header of the data packet. Example classifications include: default forwarding, expedited forwarding, and assured forwarding. Each classification may further include one or more levels of priority. Default forwarding may correspond to a best effort level of handling, in which data packets are forwarded along the network according to network conditions and availability. Expedited forwarding may provide a higher level of priority as the packet is being forwarded to provide low-loss and or low-latency to the data packets. Assured forwarding provides a higher level of priority, ensuring that predetermined data quality conditions are met as the packets are being forwarded along the network.

As packets are transmitted through the network, the packets having higher priority given greater or faster access to resources. For example, a packet having a higher priority may be transmitted redundantly to reduce packet loss, or may be transmitted ahead of packets having lower priority, reducing delay. While WMM and DiffServ are two protocols that are described by way of example, embodiments of the invention encompass any system that stores a priority value in a packet header to assign different priority levels to data packets based on predetermined criteria.

The intermediate node determines an estimated transmission time for transmitting the received data packet (Operation 206). In one embodiment, the estimated transmission time is the time for transmitting the data packet from the source node to the destination node. For example, in one embodiment, the intermediate node measures a transmission time, or latency, of a flow of packets between a source node and the intermediate node. The intermediate node then estimates the transmission time, between the source node and the intermediate node, of any particular received packet based on the measured latency of the flow of packets.

In an embodiment, determining the estimated transmission time from a source node to a destination node based on current transmission attributes may include determining estimated transmission times of different portions of the path from the source node to the destination node based on current transmission attributes. As an example, determining the estimated transmission time from a source node to a destination node may include determining (a) the estimated transmission time from the source node to the intermediate node (Operation 208) and (b) the estimated transmission time from the intermediate node to the destination node based on current transmission attributes (Operation 210). For example, the intermediate node may store values corresponding to a known transmission rate of packets between the source node and the intermediate node. In one embodiment, the transmission rate between the source node and the intermediate node is measured out of band. For example, a probe packet may be transmitted at periodic intervals. The probe packet may be echoed back to the source node. The round-trip time (RTT) of the probe packet may then be measured. The transmission time between the source node and the intermediate node, over a predefined window of time, may be measured by calculating RTT/2 for the best RTT in the predefined window of time.

Once the transmission time between the source node and the intermediate node is determined, the estimated transmission time for any packet received by the intermediate node may be calculated using a timestamp in the packet header. The timestamp identifies when the packet was sent by the source node. The intermediate node may calculate the estimated transmission time for the packet, without requiring synchronization of the clock of the source node and the clock of the intermediate node, based on: (1) the known transmission time for a packet flow between the nodes, (2) the timestamp of the packet, and (3) a known difference in time values between the clock of the source node and the clock of the intermediate node.

The intermediate node may compare the known transmission rate of a flow of packets to the estimated transmission rate for any particular packet to determine whether the packet has experienced delay between the source node and the intermediate node. In one or more embodiments, the intermediate node may determine the estimated transmission time based on reading a "history" field in a header of the data packet to identify the past experience of the data packet in the network. For example, a "history" field may store values corresponding to "delay," "jitter," "loss," "transmission time," "number of nodes traveled," or any other data that is updated based on the data packet's experience in the network. The intermediate node may update information in the "history" field to reflect any estimated delay between the source node and the intermediate node.

In another embodiment, the intermediate node may store values corresponding to a known transmission rate of packets between the intermediate node and the destination node. The intermediate node may compare the known or default transmission rate to the actual rate at which packets are received to determine whether the communication path is experiencing congestion, delay, jitter, or loss.

In one embodiment, the known transmission rate corresponds to a packet-separation interval, or a predetermined interval of time at which packets are transmitted from a source node. The intermediate node measures the rate at which the packets arrive at the intermediate node by measuring the amount of time between the arrival of one packet and a next packet. The intermediate node may then calculate the actual transmission time of the packet. For example, if a first set of packets arrives at the intermediate node at expected time intervals, and a subsequent packet arrives at a longer time interval, the intermediate node may detect a longer transmission time of the subsequent packet. By measuring changes in time intervals between packets over a predetermined period of time, the intermediate node may calculate average transmission times of packets along the transmission path between the source node and the intermediate node.

In addition, or in the alternative, the intermediate node determines whether a packet has been retransmitted. If the intermediate node determines that the packet has been retransmitted a certain number of times, based on the "history" field in the packet, then the intermediate node adds the transmission times for the prior transmissions of the packet to the estimated transmission time of the current packet.

One or more embodiments determine an estimated packet transmission time between a pair of nodes, for example, (a) an estimated transmission time from a source node to an intermediate node or (b) an estimated transmission time from an intermediate node to a destination node. The estimated transmission time for a current packet may be based on transmission of the current packet itself or based on transmission of one or more other packets that were recently transmitted.

The system may determine an estimated packet transmission time between two nodes using timestamps if the two nodes are synchronized to the same clock. Specifically, transmitting node adds a timestamp on the packet indicating a time of transmission. The receiving node computes a difference between the timestamp and the time at which the packet was received. The difference is estimated to be the transmission time.

The system may determine an estimated packet transmission time between two nodes based on a Round Trip Time (RTT) for packets transmitted between the nodes. As an example, the intermediate node may transmit a packet to the source node at time t1 and receive an acknowledgement at time t2. The difference between t1 and t2 corresponds to the RTT for both segments of the communication: the first transmission from the intermediate node to the source and the second transmission from the source node to the intermediate node. The estimated transmission time for one segment, e.g., from source node to intermediate node, may be computed as a function of the RTT. In an example, each segment is assumed to take the same amount of time. The estimated transmission time for each segment is computed based on RTT by (a) subtracting the processing time for a node to receive the packet and send an acknowledgment and (b) dividing the result from step a by two.

The system may determine an estimated packet transmission time between two nodes based on a baseline transmission time and one or more current environmental factors. The baseline transmission time for transmissions between a pair of nodes may be computed based on historical data and/or a physical distance between the pair of nodes. In an example, a baseline transmission time is determined to be 50 milliseconds based on historical data and/or a physical distance between the pair of nodes. A level of network congestion is mapped to an effect on the transmission time. In an example, a current level of network congestion is mapped to a 10% increase in transmission time. Assuming a baseline transmission time of 50 milliseconds and network congestion causing a 10% increase in transmission time, the system computes 55 milliseconds as the estimated transmission time between the pair of nodes.

In one or more embodiments, the intermediate node analyzes network characteristics without receiving separate signaling from other nodes. Specifically, the transmitted packets containing data to be transmitted from the source node to the destination node are the only pieces of data transmitted between the nodes that the intermediate node uses to analyze the network characteristics and estimate transmission times. In this embodiment, the intermediate node may, but does not necessarily, receive or rely on separate signaling from adjacent nodes to identify network conditions or calculate estimated transmission time.

In one or more embodiments, after determining the estimated transmission time for packets transmitted from the source node to the intermediate node (Operation 208), the intermediate node updates a "history" field in the header of the data packet to record the past experience of the data packet. For example, the source node may transmit the data packet having a value of "0" in a "delay" field of the header, indicating that the data packet has not yet experienced a transmission delay. Upon determining, based on the estimated transmission time of the data packet from the source node to the intermediate node (Operation 208) that the data packet has experienced delay, the intermediate node may update the value of the "delay" field in the header to "3," indicating a particular level of delay. Subsequent nodes may read the value of the "delay" field in the header to determine the past experience of the data packet and may update the field based on a most recent node-to-node transmission of the data packet, allowing the nodes to determine the past experience of the data packets without receiving separate signaling from a source node.

In one or more embodiments, the "history" information is carried by each packet header. The history information identifies the experience of the packet thus far (such as delay, jitter, or retransmission). Each intermediate node along a transmission path may update the history information. Accordingly, each intermediate node along the transmission path may treat the packet differently based on what the packet has encountered so far during transmission.

For example, the "latency" portion of the "history" field may have 8, 5 and 53, where 8 indicates that the end-to-end expected latency is 80 ms, 5 indicates the packet has already spent 50% of the latency credit (i.e., it has already been subjected to 40 ms of latency), and 53 indicates the packet corresponds to a video chat call, audio stream, with a specific CODEC, and therefore should be subjected to only a certain level of jitter, delay, etc.

In one or more embodiments, each intermediate node along a transmission path may implement any one or more acceleration techniques to a packet based on the packet "history." Different intermediate nodes may apply different acceleration techniques to the same packet based on changes in the packet "history" between the respective intermediate nodes.

In one or more embodiments, determining the estimated transmission time for the packets between the source node and the destination node, or between any two nodes, includes applying a machine learning model to the network to identify data transmission trends within the network. For example, a machine learning model may be trained with a data set including network characteristics such as congestion and loss at different times of the day, week, or month, and at different network locations. Determining the estimated transmission time may include applying the trained model to the network to identify estimated transmission times along a next segment of the network, for example. Additionally, or in the alternative, the machine learning model may estimate a data transmission time from a source node in the network to a destination node in the network. The machine learning model may estimate the data transmission time along multiple data transmission paths through the network to allow the intermediate node to identify one or more data transmission paths to utilize to transmit data to a next node in the network.

The intermediate node determines whether the estimated transmission time between the source node and the destination node satisfies the QoS requirement for a particular data packet (Operation 212). If the QoS field of the data packet contains a value indicating a priority level of "10" among two hundred (200) possible priority levels, the intermediate node identifies the QoS parameters, such as acceptable levels of delay, jitter, and loss, associated with the priority level "10." The intermediate node compares a transmission time associated with the QoS value of the data packet with the estimated transmission time of the data packets along the data network to determine whether the estimated transmission time is less than, or equal to, the transmission time associated with the packet's QoS value.

If the estimated transmission time is greater than the transmission time associated with the QoS value, the intermediate node modifies one or more transmission characteristics (Operation 214). For example, the intermediate node may alter a priority value in the priority field of the header of the data packet. Altering the priority value would result in subsequent nodes handling the data packet differently—such as transmitting the data packet before lower-priority data packets.

Altering the transmission characteristics may also include altering a redundancy of a data packet. Altering the redundancy of the data packet may be performed by the intermediate node, where the intermediate node generates one or more duplicates of the data packet to reduce loss, for example. In addition, or in the alternative, the intermediate node may alter a value in a field "redundancy" in the header of the packet to indicate to one or more subsequent nodes along the data transmission network to expect a redundant data packet or to generate a redundant data packet.

For example, the system determines that there is a high rate of failure corresponding to packet transmissions from the intermediate node to the destination node, i.e., at least one of the network hops from the intermediate node to the destination node is experiencing a high packet drop rate. Based on this high rate of failure, the intermediate node duplicates a packet received from the source node to generate a new copy of the packet. The intermediate node then transmits both the original packet and the copy toward the destination node, thereby increasing packet redundancy. An intermediate node implementing checks for packet failure rates and increasing packet redundancy improves performance over systems in which only the source node determines packet redundancy.

Altering the transmission characteristics may also include altering a transmission path of the data packet. For example, in a network in which the intermediate node is connected to the destination node via multiple different data transmission paths, the intermediate path may alter the data transmission path to which the data packet is directed based on the determining whether the estimated transmission time, using the presently-selected path, would satisfy the QoS requirements of the data packet. The different data transmission paths may have different transmission media—such as wireless transmission, wired transmission, fiber optic transmission, or cellular transmission—or may be routed through different intermediate nodes. In addition, or in the alternative, the intermediate node may alter a value in a field "transmission path" in the header of the packet to indicate to one or more subsequent nodes along the data transmission network to direct the data packet to a particular transmission path. For example, if a data transmission network includes two different types of data transmission paths, and one is typically faster than the other, the intermediate node may direct the data transmission packet to the faster data transmission path based on determining that the estimated transmission time using the slower data transmission path would not satisfy the QoS requirement of the data packet.

Altering the transmission characteristics may also include combining two or more packets prior to transmitting the packets to the next node. The two or more packets may originate from a same source node or from different source nodes. For example, if the intermediate node determines that two data packets from two separate source nodes are destined for the same destination node, the intermediate node may combine the data packets.

In one or more embodiments, the intermediate node modifies the packet transmission characteristics based on the type of data transmission segment being traversed. If the next segment along the data transmission path is a wireless data transmission segment, the intermediate node may modify a priority level of the data packet. If the next segment along the data transmission path is a transmission control protocol (TCP) segment, the intermediate node may combine multiple packets together to reduce the total number of separate packets being transmitted. The intermediate node identifies the type of transmission media in one or more subsequent segments of the data transmission path and selects or modifies different packet transmission characteristics based on the different transmission media.

Altering the transmission characteristics may also include applying different techniques based on a distance between two nodes. For example, the intermediate node may analyze an estimated transmission time between the intermediate node and the next node in the data transmission network. If the estimated transmission time is less than a predetermined threshold, the intermediate node may apply reactive techniques to alter the transmission characteristics. Reactive techniques include re-transmission of data packets and jitter-smoothing by buffering data packets. If the estimated transmission time is greater than, or equal to, the predetermined threshold, the intermediate node may apply a different set of techniques, such as proactive techniques to alter the transmission characteristics. Proactive techniques include duplication of data packets, piggybacking of one data packet onto another (or combining data packets), transmitting data packets along more than one data path towards a destination node, and forward error correction (FEC). In one or more embodiments, the predetermined threshold is selected based on application performance at the destination node. For example, the threshold may be selected to be in a range from 5 milliseconds to 20 milliseconds. At such a range, performing reactive techniques as the modification of transmission characteristics may not be noticeable by the destination node. In contrast, if a transmission time between two nodes is greater than 20 milliseconds, performing reactive techniques may cause a data transmission delay that is noticeable by a destination application. In one embodiment, the intermediate node applies (a) only reactive techniques if the estimated transmission time between two nodes is 5 milliseconds or less, (b) a combination of reactive and proactive techniques if the estimated transmission time between two nodes is between 5 milliseconds and 20 milliseconds, and (c) only proactive techniques if the estimated transmission time between the two nodes is 20 milliseconds or more. While the values of 5 milliseconds and 20 milliseconds are provided by way of example, any values may be selected according to network characteristics and the applications or processes being performed at the destination node.

Upon modifying the transmission characteristics of the data packet (Operation 214), the intermediate node transmits the data packet to the next node along the data transmission path toward the destination node (Operation 216). In the event that the estimated transmission time satisfied the data packet's QoS requirement (Operation 212), the intermediate node transmits the data packet to the next node along the data transmission path without modifying data transmission characteristics (Operation 216).

4. Example Embodiment of Data Packet

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
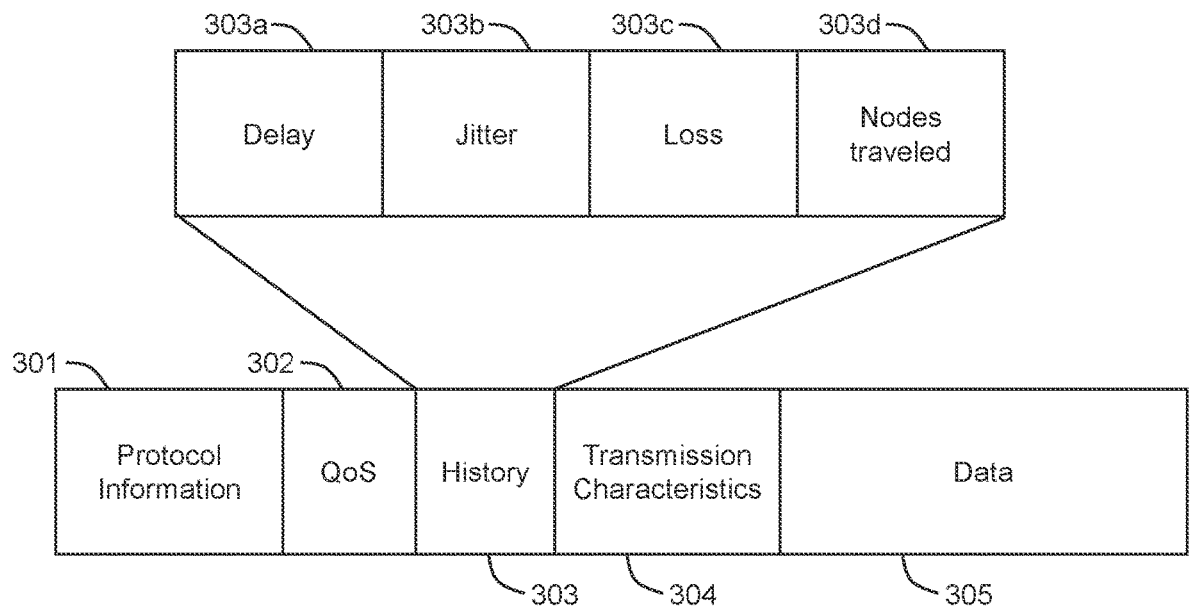
FIG. 3 illustrates an example of a data packet in accordance with one or more embodiments.

FIG. 3 illustrates a data packet 300 according to an example embodiment. The data packet 300 includes protocol information 301 corresponding to a network through with the data packet 300 is to be transmitted. When the data packet 300 is transmitted through multiple networks, such as a local wireless network connected to a core data network, the data packet may include multiple protocol fields 301 corresponding to the multiple different protocols of the different networks.

The data packet 300 includes a QoS field 302. The QoS field defines a quality of service that the data packet 300 requires during transmission from a source node to a destination node in a network. The QoS field 302 may include different values for packet transmission requirements such as a required transmission time of the packet, an acceptable level of jitter experienced by the packet, and an acceptable level of loss experienced by the packet. While these packet transmission characteristics are provided by way of example, embodiments encompass any types of packet transmission requirements affecting the QoS of a packet flow. In one or more embodiments, the QoS field 302 is a single priority index value. The priority index value may be mapped to different network conditions. For example, a priority index value of "1" may be mapped to values of 100, 11, and 1 for transmission time, jitter, and loss, respectively. The values for transmission time, jitter, and loss correspond to values such as a transmission time in milliseconds, jitter in milliseconds, and packet loss measured in percentage. A priority index value of "2" may be mapped to values of 100, 18, and 3 for transmission time, jitter, and loss, respectively. A priority index value of "3" may be mapped to values of 160, 11, and 3 for transmission time, jitter, and loss, respectively. A priority index value of "4" may be mapped to values of 160, 20, and 6 for transmission time, jitter, and loss, respectively. In other words, different priority index values may be mapped to different packet transmission requirements. In addition, a priority index value at one end of the index generally corresponds to stricter QoS requirements than a priority index value at an opposite end of the index.

The data packet 300 also includes a "history" field 303. The history field 303 records the experience of the data packet so far along the data transmission path. For example, when a data packet is initiated, the history field 303 may have values of "0," indicating the data packet has not yet experienced delay, jitter, and loss, and has not been transmitted to another node. When the data packet is transmitted to a first intermediate node, the first intermediate node may update the history field to include measured or estimated values of the transmission, such as "50" for delay 303a, "10" for jitter 303b, "1" for loss 303c, and "1" for nodes traveled 303d. When the data packet is transmitted from the first intermediate node to a second intermediate node, the second intermediate node may update the history field to reflect the second data transmission, such as "120" for a delay 303a, "11" for jitter 303b, "5" for loss 303c, and "2" for nodes traveled 303d. The history field 303c allows the intermediate nodes to receive data regarding the history of the data packet without receiving separate signaling from previous nodes along the data transmission network.

The data packet 300 includes a field to set transmission characteristics 304 for the data packet 300. Examples of transmission characteristics include values to represent: (a) a priority level for the packet, (b) a redundancy value indicating whether a redundant copy of the packet has been generated, or should be generated by a subsequent node, and (c) a transmission path value indicating whether the packet should be directed along a particular transmission path through the network. While these are provided by way of example, embodiments encompass any data packet transmission characteristics that indicate how the data packet has been handled, or how the packet should be handled, in the network.

The data packet 300 also includes data 305 that is destined for the destination node, to be used by the destination node in one or more processes or applications.

5. Example Embodiment of Modification of Packet Transmission Characteristics by an Intermediate Node A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
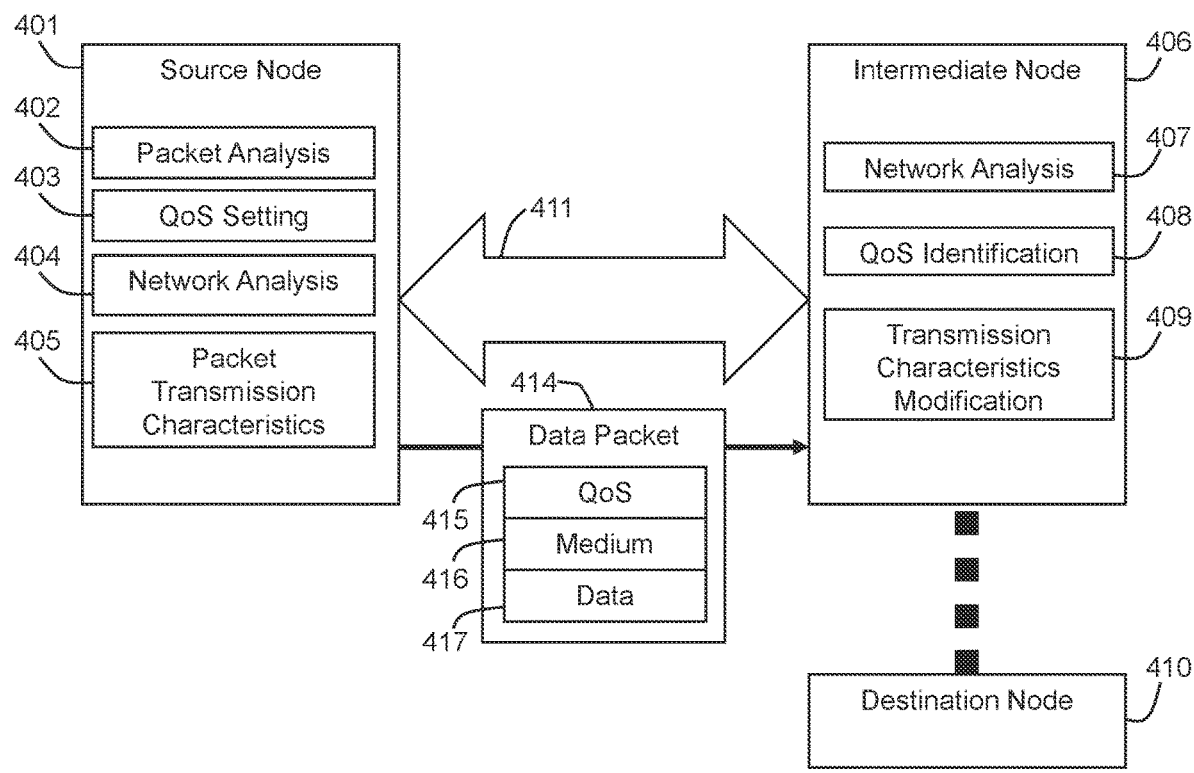
FIGS. 4A and 4B illustrate an example set of changing transmission characteristics of data packets by an intermediate node in accordance with one or more embodiments.
Figure 4B:
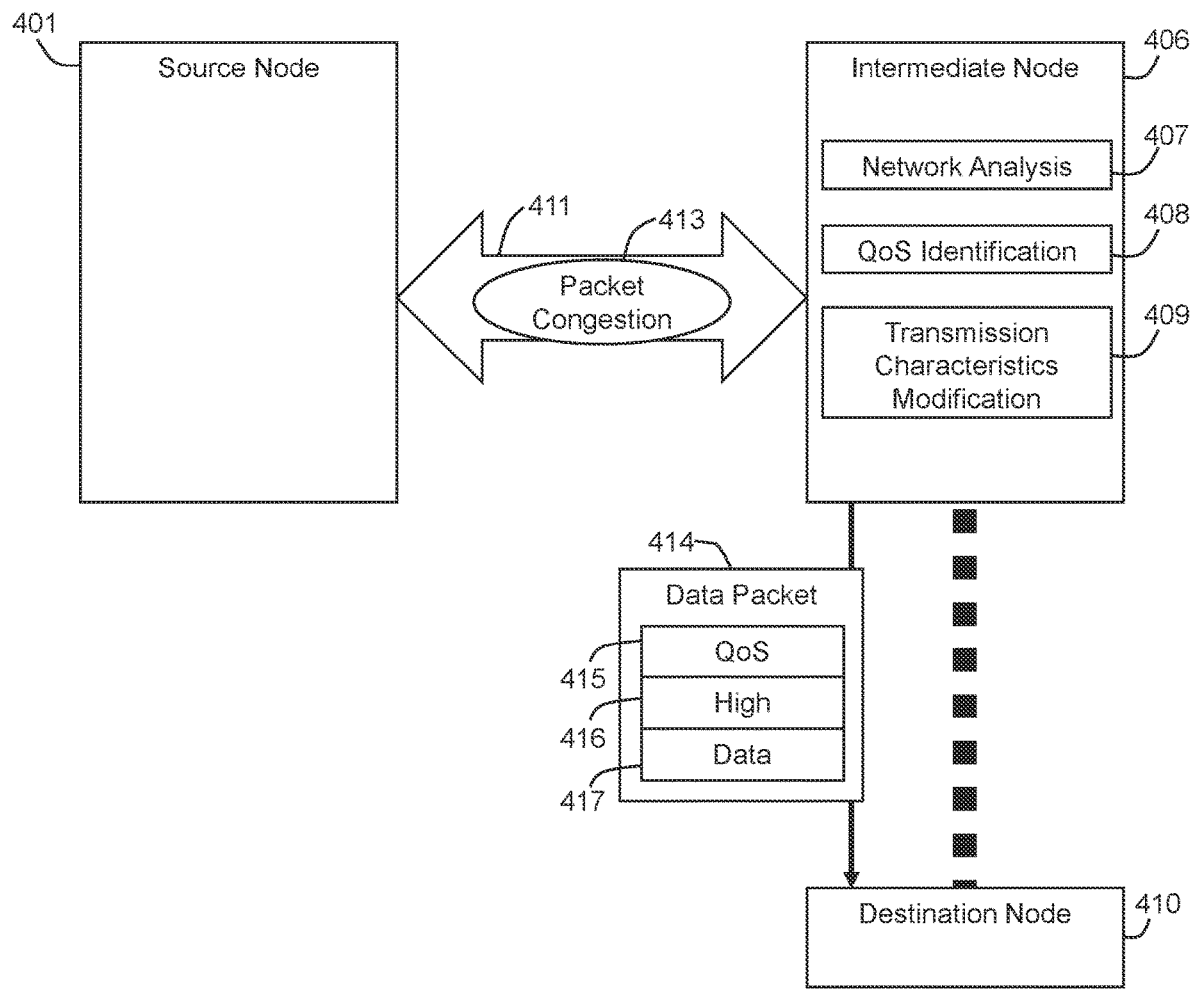

FIGS. 4A and 4B illustrate an example of modification of data packet transmission characteristics by an intermediate node according to one embodiment.

A source node 401 includes a packet analysis module 402 that analyzes the data packet to determine packet characteristics. A quality-of-service (QoS) setting module 403 sets a quality-of-service (QoS) for the packet based on the characteristics of the packet. For example, the packet analysis module 402 may determine that the data packet is a voice-type data packet and the QoS module 403 may assign an appropriate priority level to the packet. In the example illustrated in FIG. 4A, the data packet 414 is assigned a QoS value 415.

The source node 401 may include a network analysis module 404 to analyze network conditions, such as network congestion, delay, jitter, loss, and estimated transmission time of a packet from the source node 401 to the destination node 410. A packet transmission parameter module 405 sets packet parameters based on the QoS requirements of the packet and the network conditions. In the example shown in FIG. 4A, the packet transmission characteristics module 405 sets a priority level 416 of the data packet 414 to "medium" based on the estimated data transmission time and the QoS requirements of the data packet 414.

The source node 401 generates the data packet 414 including the QoS requirements 415 and the priority level 416 of the data packet 414 in the header of the data packet and data 417 in the body of the data packet 414. The source node 401 transmits the data packet 414 along a path 411 between the source node and the intermediate node 406.

The intermediate node 406 receives the data packet 414. The intermediate node 406 includes a network analysis module 407 to analyze network conditions. In the example illustrated in FIG. 4B, the path 411 includes packet congestion 413 resulting in packet delay between the source node 401 and the intermediate node 406.

The intermediate node 406 also includes a QoS identification module 408 that reads the packet header to identify a QoS requirement 415 for the data packet 414. Based on the network analysis and the QoS requirement, the intermediate node determines whether a transmission characteristic of the data packet 414 requires modification 409. In the example illustrated in FIG. 4B, since the communication path 411 had packet congestion 413, the network analysis module 407 determines that an estimated transmission time for the packet 414 having a "medium" priority level would exceed a required transmission time associated with the QoS requirements 415 of the data packet 414. The transmission parameter modification module 409 modifies a priority 416 of the data packet 414 to a "high" level. By increasing the priority level from "medium" to "high," the intermediate node gives the data packet preferential treatment over lower-priority data packets, and subsequent nodes receiving the data packet 414 may also handle the data packet 414 according to the elevated priority level.

The dotted lines between the intermediate node 406 and the destination node 410 represent additional intervening intermediate nodes in the network. The operations described above with respect to the intermediate node 406 may be performed by any one or more of the additional intervening intermediate nodes to provide modification to data packet transmission characteristics by intermediate nodes.

While FIGS. 4A and 4B provide an example of modifying a priority value of a data packet as a transmission parameter modification, as discussed above, intermediate nodes may select or modify multiple different types of transmission characteristics, including priority values, redundancy of data packets, re-routing of data packets, and piggy-backing data packets. While some of these modifications, such as modifying a packet priority value, are recorded in the data packet header to be accessed by subsequent nodes, others may be performed by the intermediate node without being recorded in the packet header.

While FIGS. 4A and 4B provide an example, of identifying a delay in the data communications path between a source node and an intermediate node, embodiments encompass various types of network analysis, including estimating data packet transmission times between: (a) an intermediate node and an immediately previous node, (b) the intermediate node and a source node, (c) the intermediate node and an immediately subsequent node, (d) the intermediate node and a destination node, and (e) the source node and the destination node. Additionally, or in the alternative, transmission characteristics may be selected and modified based on additional network characteristics, such as delay, jitter, and loss.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
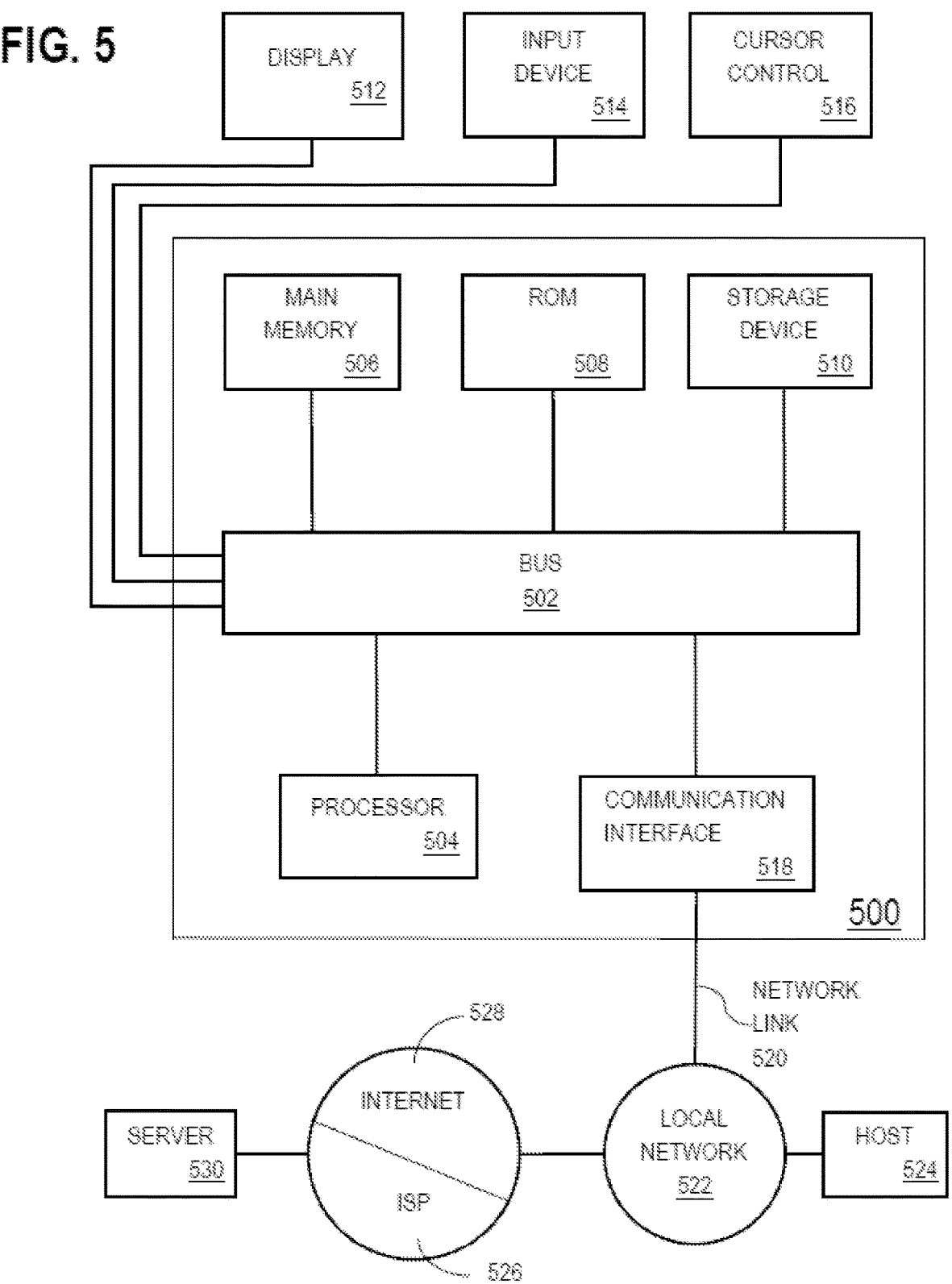
FIG. 5 is a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:

determining, by an intermediate node between a source node and a destination node, a current estimated transmission time for packets being transmitted from the source node to the intermediate node;

receiving, at the intermediate node from the source node, a data packet;

analyzing the data packet to determine a Quality of Service (QoS) requirement for transmission of the data packet, wherein the QoS requirement for transmission of the data packet specifies an amount of time for transmission of the data packet from the source node to the destination node;

determining an estimated transmission time for the data packet from the source node to the intermediate node;

selecting, by the intermediate node, one or more transmission characteristics for forwarding the data packet toward the destination node based on the QoS requirement for the transmission of the data packet and the estimated transmission time for the data packet from the source node to the intermediate node; and transmitting, by the intermediate node toward the destination node, the data packet in accordance with the one or more transmission characteristics, wherein the selecting the one or more transmission characteristics comprises:

determining a time requirement for transmission of the data packet from the intermediate node to the destination node based on (a) the current estimated transmission time for packets being transmitted from the source node to the intermediate node and (b) the QoS requirement for transmission of the data packet; and selecting the one or more transmission characteristics based on the time requirement for transmission of the data packet from the intermediate node to the destination node.

2. The medium of claim 1, wherein the QoS requirement for transmission of the data packet specifies an amount of time for transmission of the data packet from the source node to the intermediate node, and wherein the selecting the one or more transmission characteristics comprises:

responsive to determining that (a) the current estimated transmission time for packets being transmitted from the source node to the intermediate node does not meet (b) the QoS requirement for transmission of the data packet from the source node to the intermediate node:

increasing a packet priority corresponding to the data packet.

3. The medium of claim 1, wherein selecting the one or more transmission characteristics comprises selecting a level of redundancy, a transmission path, or a priority for transmitting the data packet.

4. The medium of claim 1, wherein the operations further comprise modifying attributes of the data packet prior to transmitting the data packet, wherein the attributes comprise one or more of: packet priority and packet redundancy level.

5. The medium of claim 1, wherein determining the current estimated transmission time for packets being transmitted from the source node to the intermediate node comprises receiving the current estimated transmission time from the source node.

6. The medium of claim 1, wherein determining the current estimated transmission time for packets being transmitted from the source node to the intermediate node comprises monitoring real-time network conditions to determine the current estimated transmission time.

7. The medium of claim 1, wherein determining the current estimated transmission time for packets being transmitted from the source node to the intermediate node is based at least in part on one of: (a) a first Round Trip Time (RTT) between the source node and the intermediate node or (b) a second Round Trip Time (RTT) between the intermediate node and the source node.

8. The medium of claim 1, wherein determining the current estimated transmission time for packets being transmitted from the source node to the intermediate node is based on previous packet transmissions within a threshold period of time prior to transmission of the data packet.

9. The medium of claim 1, wherein determining the current estimated transmission time for packets being transmitted from the source node to the intermediate node comprises:
   training a machine learning model to compute communication path attributes for at least one communication path between the source node and the destination node, the training comprising:
      obtaining training data sets of historical communication path data, each training data set comprising one or more of:
         attributes of the at least one communication path between the source node and the destination node; and
         a time taken for data packets to travel along the at least one communication path; and
      training the machine learning model based on the training data sets;
   applying the machine learning model to estimate the transmission time for the packets being transmitted from the source node to the intermediate node.

10. The medium of claim 1, wherein the source node is a second intermediate node prior to said intermediate node on a transmission path for the data packet.

11. The medium of claim 1, wherein the source node is a node that initially generated the data packet.

12. The medium of claim 1, wherein the estimated transmission time for the data packet from the source node to the intermediate node is based on the current estimated transmission time for packets being transmitted from the source node to the intermediate node.

13. A method, comprising:
   determining, by an intermediate node between a source node and a destination node, a current estimated transmission time for packets being transmitted from the source node to the intermediate node;
   receiving, at the intermediate node from the source node, a data packet;
   analyzing the data packet to determine a Quality of Service (QoS) requirement for transmission of the data packet;
   determining an estimated transmission time for the data packet from the source node to the intermediate node;
   selecting, by the intermediate node, one or more transmission characteristics for forwarding the data packet toward the destination node based on the QoS requirement for the transmission of the data packet and the estimated transmission time for the data packet from the source node to the intermediate node; and
   transmitting, by the intermediate node toward the destination node, the data packet in accordance with the one or more transmission characteristics,
   wherein the QoS requirement for transmission of the data packet specifies an amount of time for transmission of the data packet from the source node to the destination node, and
   wherein the selecting the one or more transmission characteristics comprises:
      determining a time requirement for transmission of the data packet from the intermediate node to the destination node based on (a) the current estimated transmission time for packets being transmitted from the source node to the intermediate node and (b) the QoS requirement for transmission of the data packet; and
      selecting the one or more transmission characteristics based on the time requirement for transmission of the data packet from the intermediate node to the destination node.

14. The method of claim 13, wherein the QoS requirement for transmission of the data packet specifies an amount of time for transmission of the data packet from the source node to the intermediate node, and wherein the selecting the one or more transmission characteristics comprises:
   responsive to determining that (a) the current estimated transmission time for packets being transmitted from the source node to the intermediate node does not meet (b) the QoS requirement for transmission of the data packet from the source node to the intermediate node:
      increasing a packet priority corresponding to the data packet.

15. The method of claim 13, wherein selecting the one or more transmission characteristics comprises selecting a level of redundancy, a transmission path, or a priority for transmitting the data packet.

16. The method of claim 13, further comprising modifying attributes of the data packet prior to transmitting the data packet, wherein the attributes comprise one or more of: packet priority and packet redundancy level.

17. The method of claim 13, wherein determining the current estimated transmission time for packets being transmitted from the source node to the intermediate node comprises receiving the current estimated transmission time from the source node.

18. The method of claim 13, wherein determining the current estimated transmission time for packets being transmitted from the source node to the intermediate node comprises monitoring real-time network conditions to determine the current estimated transmission time.

19. The method of claim 13, wherein determining the current estimated transmission time for packets being transmitted from the source node to the intermediate node is based at least in part on one of: (a) a first Round Trip Time (RTT) between the source node and the intermediate node or (b) a second Round Trip Time (RTT) between the intermediate node and the source node.

20. The method of claim 13, wherein determining the current estimated transmission time for packets being transmitted from the source node to the intermediate node is based on previous packet transmissions within a threshold period of time prior to transmission of the data packet.

21. The method of claim 13, wherein determining the current estimated transmission time for packets being transmitted from the source node to the intermediate node comprises:
   training a machine learning model to compute communication path attributes for at least one communication path between the source node and the destination node, the training comprising:
      obtaining training data sets of historical communication path data, each training data set comprising one or more of:

attributes of the at least one communication path between the source node and the destination node; and a time taken for data packets to travel along the at least one communication path; and training the machine learning model based on the training data sets;

applying the machine learning model to estimate the transmission time for the packets being transmitted from the source node to the intermediate node.

22. An apparatus comprising:

one or more processors; and memory storing instructions that, when executed by the one or more processors, cause the apparatus to:

determine, by an intermediate node between a source node and a destination node, a current estimated transmission time for packets being transmitted from the source node to the intermediate node;

receive, at the intermediate node from the source node, a data packet;

analyze the data packet to determine a Quality of Service (QoS) requirement for transmission of the data packet;

determine an estimated transmission time for the data packet from the source node to the intermediate node;

select, by the intermediate node, one or more transmission characteristics for forwarding the data packet toward the destination node based on the QoS requirement for the transmission of the data packet and the estimated transmission time for the data packet from the source node to the intermediate node; and transmit, by the intermediate node toward the destination node, the data packet in accordance with the one or more transmission characteristics, wherein the QoS requirement for transmission of the data packet specifies an amount of time for transmission of the data packet from the source node to the destination node, and wherein the selecting the one or more transmission characteristics comprises:

determining a time requirement for transmission of the data packet from the intermediate node to the destination node based on (a) the current estimated transmission time for packets being transmitted from the source node to the intermediate node and (b) the QoS requirement for transmission of the data packet; and selecting the one or more transmission characteristics based on the time requirement for transmission of the data packet from the intermediate node to the destination node.

\* \* \* \* \*